(12) United States Patent
Chen

(10) Patent No.: US 7,463,483 B1
(45) Date of Patent: Dec. 9, 2008

(54) BRACKET STRUCTURE

(75) Inventor: Jui-Lin Chen, Taipei (TW)

(73) Assignee: Inventec Corporation, Taipei (TW)

( * ) Notice: Subject to any disclaimer, the term of this patent is extended or adjusted under 35 U.S.C. 154(b) by 63 days.

(21) Appl. No.: 11/806,759

(22) Filed: Jun. 4, 2007

(51) Int. Cl.
*G06F 1/16* (2006.01)

(52) U.S. Cl. ............... 361/685; 360/96.51; 365/189.05; 248/262; 16/263

(58) Field of Classification Search ............ 360/85, 360/96.51; 248/462, 262, 309.1; 16/221, 16/328, 263; 160/121.1, 188; 365/189.5; 347/29; 361/679–687, 724–727
See application file for complete search history.

(56) References Cited

U.S. PATENT DOCUMENTS

| 5,390,057 | A * | 2/1995 | Nishimura et al. ....... 360/96.51 |
| 6,882,527 | B2 * | 4/2005 | Wang et al. ................ 361/685 |
| 2006/0120170 | A1 * | 6/2006 | Chen et al. ............. 365/189.05 |
| 2007/0103857 | A1 * | 5/2007 | Weech et al. ............... 361/683 |

* cited by examiner

*Primary Examiner*—Hung V Duong
(74) *Attorney, Agent, or Firm*—Rabin & Berdo, PC

(57) ABSTRACT

A bracket structure is utilized to assemble an electronic device into a case. The bracket structure includes a main bracket, a side bracket, a pin, and a guiding groove. The main bracket has a chassis and a bracket wall. The electronic device would be assembled on the chassis. The side bracket would be disposed on a case wall of the case. The pin would be protruded on a surface facing the side bracket of the bracket wall. The guiding groove is disposed on the side bracket. The pin would slide in the guiding groove to guide the main bracket into the case.

19 Claims, 5 Drawing Sheets

BRACKET STRUCTURE

BACKGROUND

1. Field of Invention

The present invention relates to a bracket structure. More particularly, the present invention relates to bracket structure for a hard disk assembly.

2. Description of Related Art

Information technology and the computer industry are highly developed now. People rely heavily on computer systems. Therefore, computer servers with higher calculation capacity and higher stability are important for computer systems. Due to increasingly reduced office space, an area occupied by a computer server must also be reduced. Thus, the hardware arrangement in the computer server is restricted by reduced space.

The computer server, such as a blade server may have many hard disks or other storage medias to provide data accessing function. The reduced volume and the inner space of the blade server sometimes would not provide enough assembly space to lie down the hard disk horizontally. Furthermore, the hard disk would collide with other hardware caused by the reduced inner space.

Thus, there is a need to improve the hard disk assembly reliability in the reduced space in the blade server.

SUMMARY

It is therefore objective of the present invention to provide a bracket structure to assemble an electronic device in a case.

It is another an objective of the present invention to provide the bracket structure to prevent unwanted collision during assembly the electronic device.

The invention provides a bracket structure for assembling a electronic device in a case. The bracket structure includes a main bracket, a side bracket, a pin, and a guiding groove. The main bracket has a chassis and a bracket wall. The bracket wall is placed surrounding the chassis. The electronic device is disposed on the chassis. The case has a case wall and the side bracket is disposed on the case wall. The bracket wall of the main bracket has a surface facing the side bracket, and the pin protrudes from the surface. The guiding groove is formed on the side bracket, and the pin is slid in the guiding groove to guide the main bracket sliding into the case.

The invention also provides a server to utilize the bracket structure. The server includes a server case, and a hard disk. The server case has two case walls. The bracket structure may assemble the hard disk in the case. The bracket structure includes a main bracket, two side brackets, two pins, and two guiding grooves. The main bracket has a chassis and a bracket wall; the bracket walls are placed surrounding the chassis. The hard disk is disposed on the chassis. The side bracket is disposed on the case wall. The bracket wall of the main bracket has a surface facing the side bracket. Each pin is protruded from the surface of each bracket wall respectively. Each guiding groove is formed on each side bracket respectively, and the pin is slid in the guiding groove to guide the main bracket while sliding into the server case.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
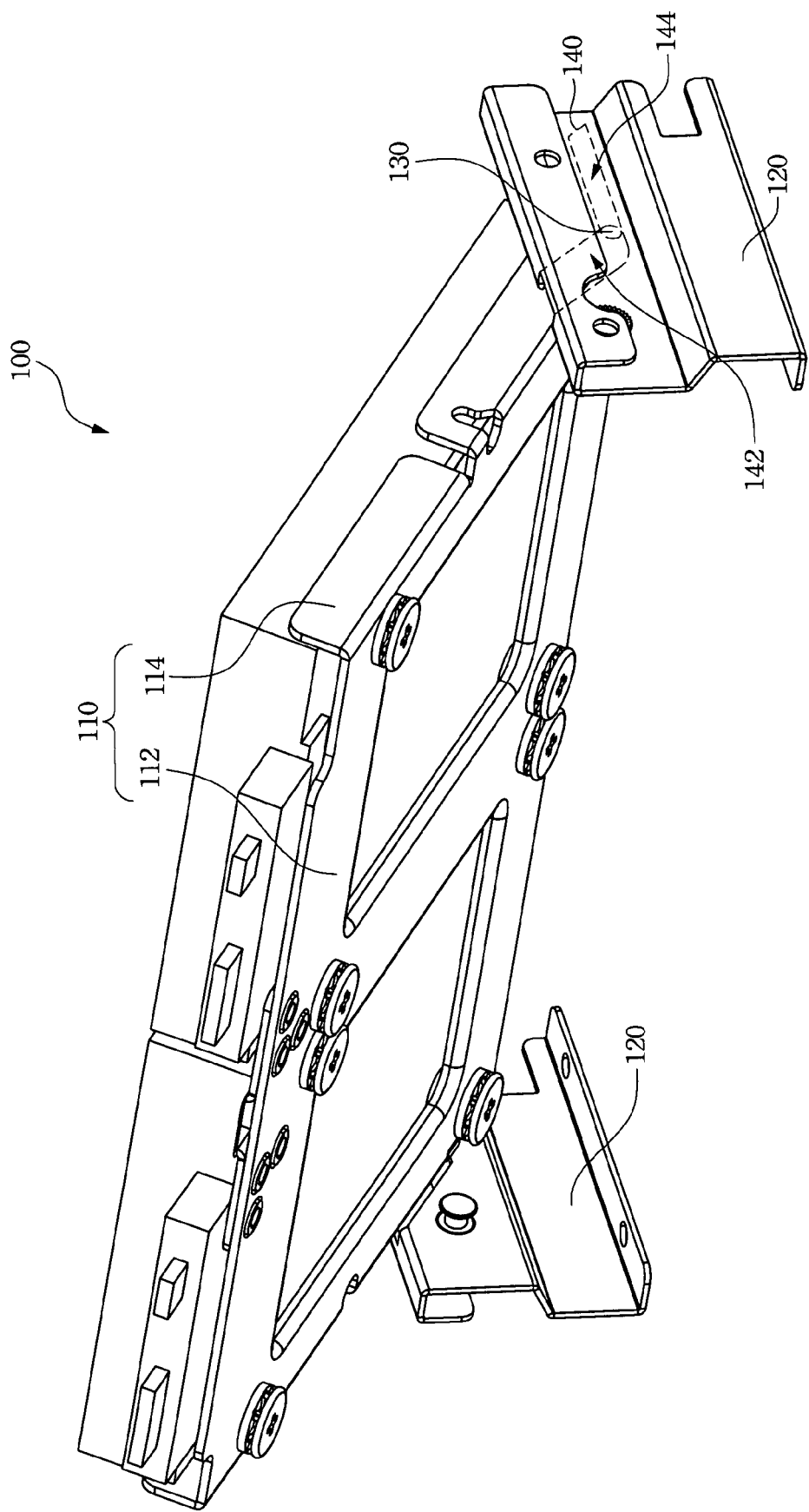
FIG. 1 is an oblique diagram of an embodiment of a bracket structure of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates an oblique diagram of an embodiment of a bracket structure of the invention. The bracket structure 100 includes a main bracket 110, a side bracket 120, a pin 130, and a guiding groove 140. The bracket wall is placed surrounding the chassis. There are two side brackets 120 in this embodiment. The side brackets 120 may be disposed on two opposite sides of the main bracket 110. The main bracket 110 has a chassis 112 and a bracket wall 114. The chassis 112 may be a rectangle chassis. There are two bracket walls 114. The bracket walls 114 stand on two opposite sides of the chassis 112 and face the side bracket 120. Each bracket wall 114 has a surface facing the side bracket 120 respectively, and the pin 130 protrudes from the surface of the bracket wall 114. The guiding groove 140 may be formed on the side bracket 120. The pin 130 may be slid in the guiding groove 140 when the main bracket 110 slides in the side bracket 120. The pin 130 may be slid into a bottom of the guiding groove 140 to pull the main bracket 110 to a predetermined position. The pin 130 may be a cylinder to reduce a friction force generated when the pin 130 slides in the guiding groove 140. The guiding groove 140 has an entrance section 142 and a bottom section 144. The entrance section 142 may be a downward inclined opening, and the bottom section 144 may be a horizontal flange. The pin 130 may slide into an end of the bottom section 144 from the entrance section 142.

Figure 2:
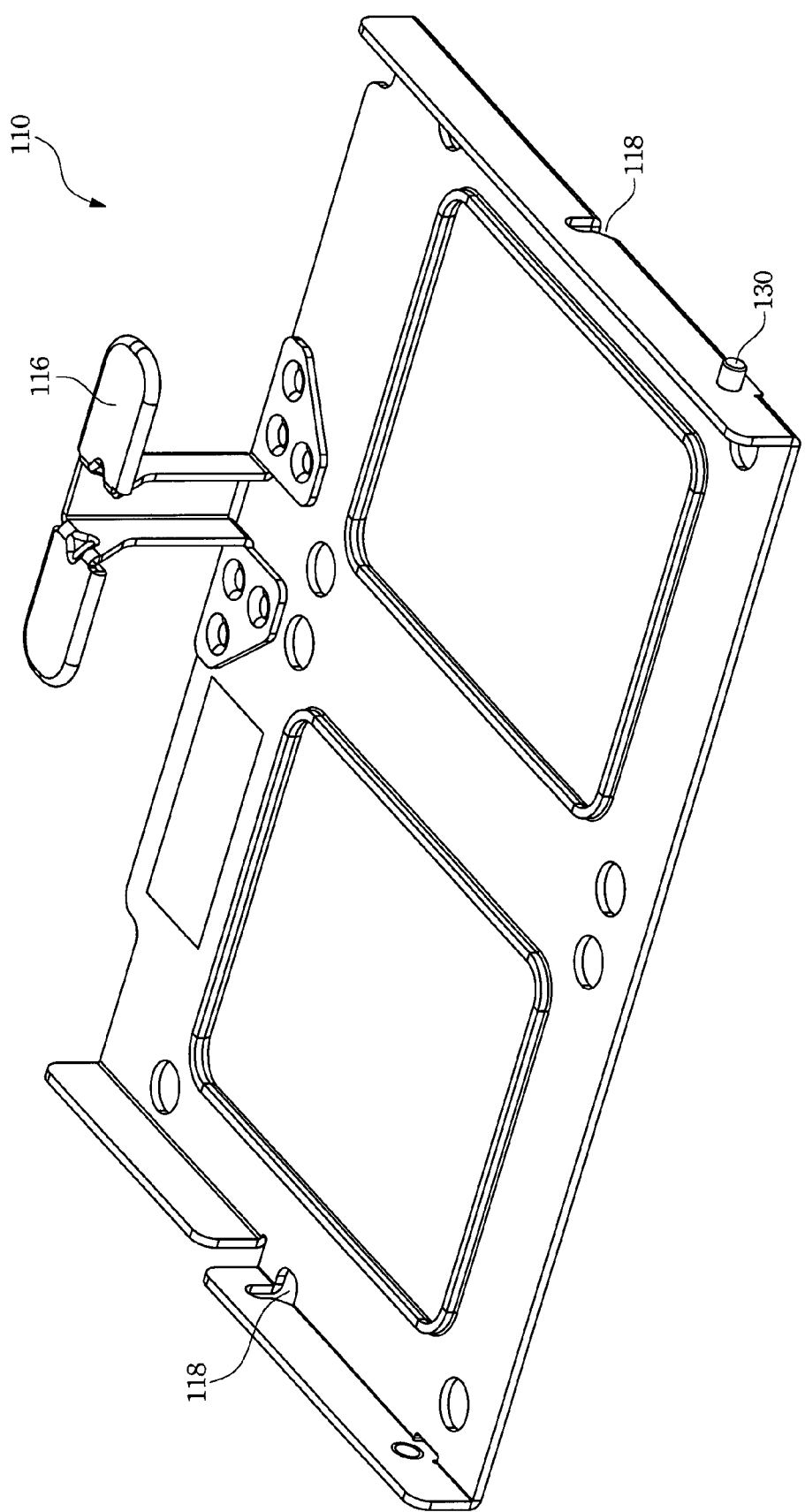
FIG. 2 is an oblique diagram of an embodiment of a main bracket of the bracket structure of the invention.
Figure 3:
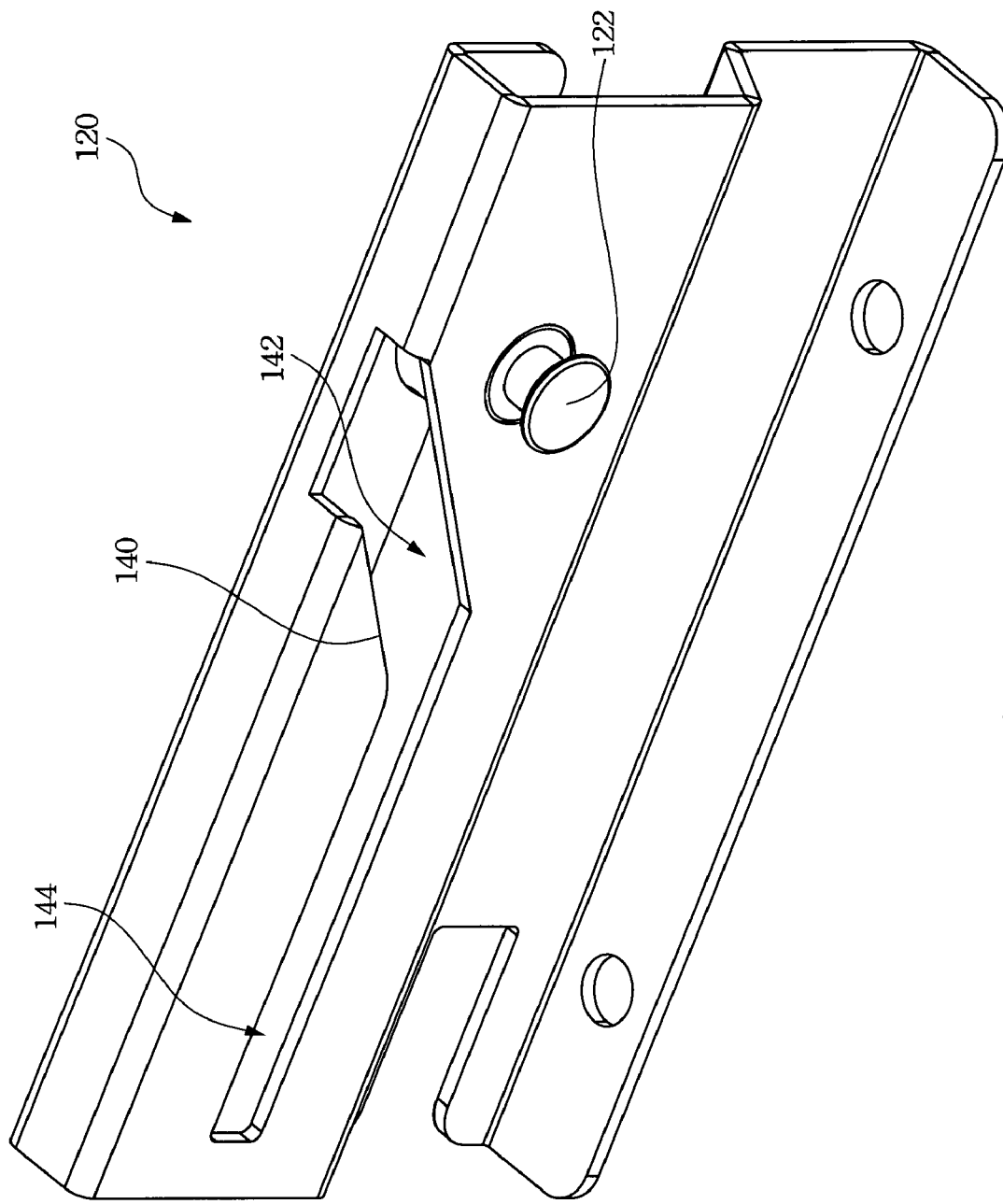
FIG. 3 is an oblique diagram of an embodiment of a side bracket of the bracket structure of the invention.

Refer to FIG. 2. FIG. 2 illustrates an oblique diagram of an embodiment of the main bracket 110 of the bracket structure 100. The main bracket 110 further includes a handle 116 for facilitating a hold on the main bracket 110. The handle 116 may be a T-shaped handle. The handle 116 may be disposed on a side without the bracket wall 114 of the chassis 112 of the main bracket 110. Refer to FIG. 3 simultaneously. FIG. 3 illustrates an oblique diagram of an embodiment of the side bracket 120 of the bracket structure 100. The side bracket 120 may have a position protrusion 122 disposed under the entrance section 142, and the main bracket 110 may have a position hole 118 disposed between the bracket wall 114 and the chassis 112. The position hole 118 is disposed corresponding to the position protrusion 122. The main bracket 110 may be tipped when the pin 130 slides in the downward inclined entrance section 142 of the guiding groove 140. Then, the pin 130 is regarded as a pivot and the main bracket 110 may be lain down to couple the position hole 118 with the position protrusion 122 of the side bracket 120 to fix the main bracket 110 on the side bracket 120 when the pin 130 slides to the end of the bottom section 144.

The bracket structure 100 in FIG. 1 may be utilized to assemble an electronic device on a case. For example, the electronic device may be disposed on the chassis 112 of the main bracket 110. The side bracket 120 may be disposed on a case wall of the case. The main bracket 110 is tipped and slid in the case by sliding the pin 130 into the guiding groove 140, thus the electronic device may be assembled on the case by fixing the main bracket 110 to the side bracket 120.

Figure 4A:
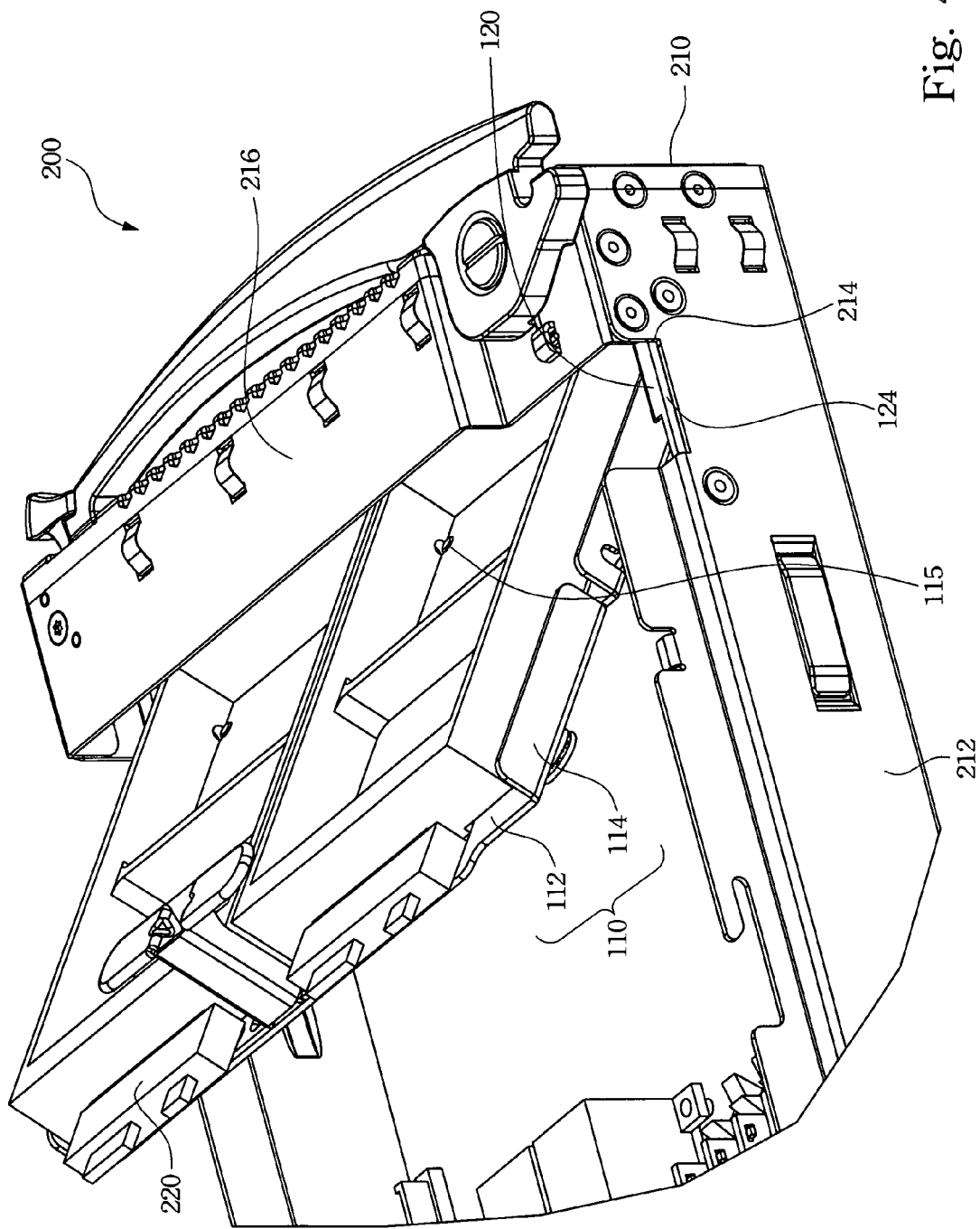
FIG. 4A and FIG. 4B are schematic diagrams of an embodiment of a server utilized the bracket structure of the invention.
Figure 4B:
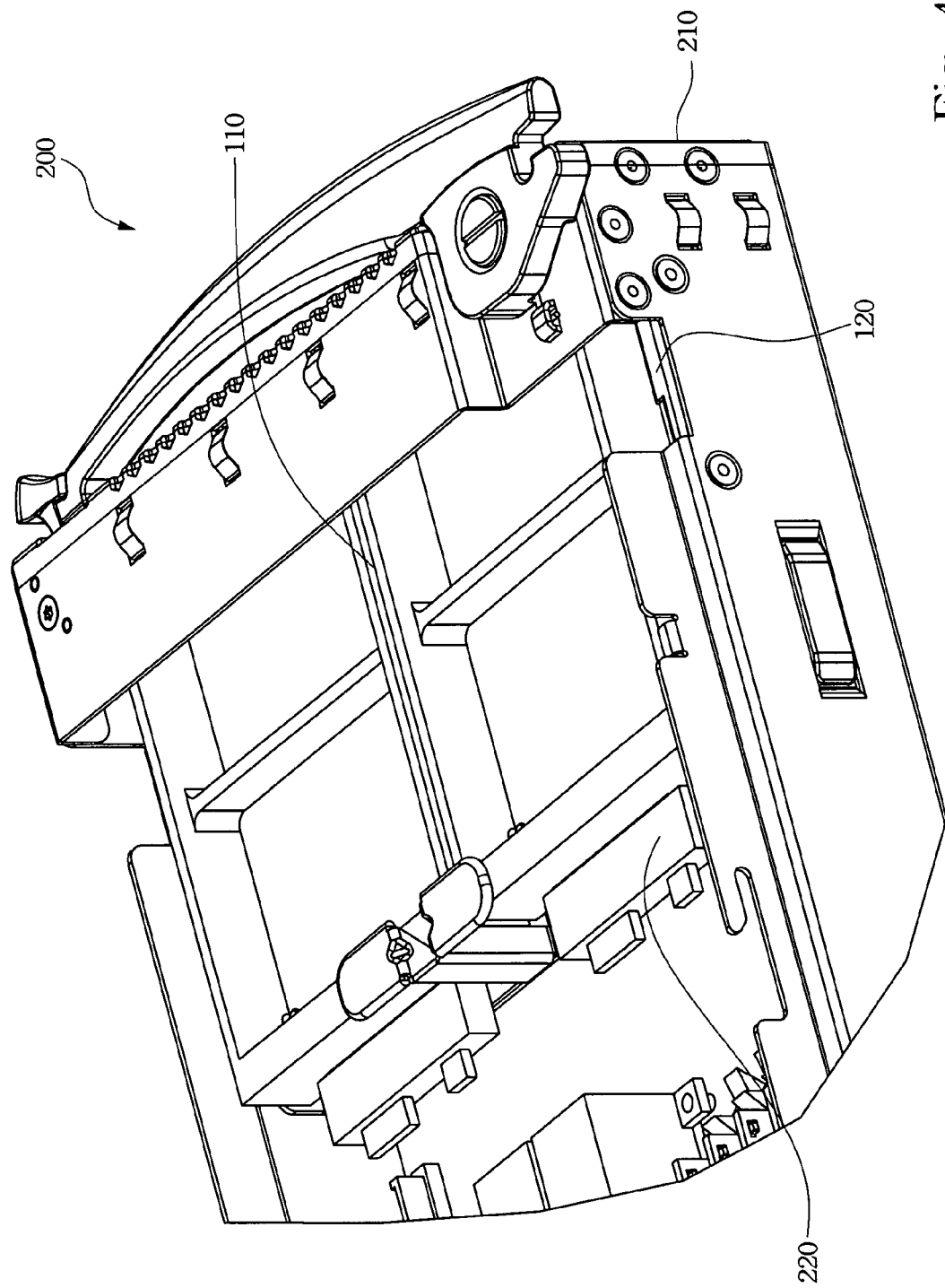

Refer to FIG. 4A and FIG. 4B. FIG. 4A and FIG. 4B are schematic diagrams of an embodiment of a server 200, especially a blade server, utilizing the bracket structure 100 of the invention. The server 200 includes a server case 210 and a hard disk 220. As shown in FIG. 4A, there are several other peripherals placed in the server 200 and space in server 200 is limited. An unwanted collision caused by the limited space may be generated when assembling the hard disk 220 in the server 200. In this embodiment, the main bracket 110 and the hard disk 220 may be assembled behind a panel (not shown), thus, a part of the main bracket 110 and a part of the hard disk 220 may be covered by a protecting cover 216 of the server case 210. It is uneasy to screw the main bracket 110 and the hard disk 220 in a conventional method.

In this embodiment, the bracket walls 114 of the main bracket 110 may not only surround the chassis 112, but also divide the main bracket 110 to several areas for placing a plurality of the hard disks 220 on the chassis 112. The bracket wall 114 has a surface facing the hard disk 220, the bracket wall 114 has a repressing portion 115 disposed on the surface of the bracket wall 114 to repress and fix the hard disk 220 on the chassis 112 of the main bracket 110. The server case 210 has at least two case walls 212. The side bracket 120 is disposed on one of the case walls 212 of the server case 210. The case wall 212 may have a case opening 214; the side bracket 120 may have a hook 124. The hook 124 may be coupled with the case opening 214 to fix the side bracket 120 on the server case 210. The hard disk 220 is assembled on the chassis 112 of the main bracket 110. The pin 130 may slide in the guiding groove 140 to guide the main bracket 110 and the hard disk 220 slide along the downward inclined entrance section 142. The main bracket 110 and the hard disk 220 may slide in the server case 210 with an inclined angle to dodge the peripherals behind the main bracket 110. Then, the pin 130 is regarded as the pivot to lie down the main bracket 110. As shown in FIG. 4B, the position protrusion 122 of the side bracket 120 may couple with the position hole 118 of the main bracket 110 to fix the main bracket 110 and the hard disk 220 in the server case 210.

The inclined angle of the main bracket and the hard disk sliding in the server case may be controlled by sliding the pin in the guiding groove. Thus, the unwanted collision when assembling the main bracket in the server may be reduced by dodging the peripherals with the inclined angle of the main bracket. The main bracket may be fixed by coupling the position protrusion of the side bracket and the position hole of the main bracket, and may prevent using screws.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bracket structure for assembling an electronic device in a case comprising:
    a main bracket having a chassis and a bracket wall, wherein the bracket wall is placed surrounding the chassis, the electronic device is disposed on the chassis;
    a side bracket, wherein the case has a case wall and the side bracket is disposed on the case wall;
    a pin, wherein the bracket wall of the main bracket has a surface facing the side bracket, the pin is protruded from the surface; and
    a guiding groove formed on the side bracket, wherein the pin is slid in the guiding groove to guide the main bracket sliding into the case.

2. The bracket structure of claim 1, wherein the electronic device is a hard disk.

3. The bracket structure of claim 1, wherein the case is a server case.

4. The bracket structure of claim 1, wherein the bracket structure comprises a handle disposed on the main bracket for facilitating assembling the electronic device in the case.

5. The bracket structure of claim 4, wherein the handle is a T-shaped handle.

6. The bracket structure of claim 1, wherein the pin is a cylinder.

7. The bracket structure of claim 1, wherein the guiding groove comprises an entrance section and a bottom section, the pin is slid into the bottom section from the entrance section.

8. The bracket structure of claim 7, wherein the entrance section is a downward inclined opening, the bottom section is a horizontal flange.

9. The bracket structure of claim 7, wherein the side bracket comprises a position protrusion disposed under the entrance section, the main bracket comprises a position hole disposed between the bracket wall and the chassis, wherein the position protrusion is coupled with the position hole to position the main bracket in the case.

10. The bracket structure of claim 1, wherein the bracket wall has a surface facing the electronic device, the bracket wall comprises a repressing portion disposed on the surface of the bracket wall to repress the electronic device on the chassis of the main bracket.

11. A server comprising:
    a server case having two case walls;
    a hard disk; and
    a bracket structure for assembling the hard disk in the server case comprising:
        a main bracket having a chassis and two bracket walls, wherein the bracket walls are placed surrounding the chassis, the electronic device is disposed on the chassis,
        two side bracket disposed on the case wall respectively,
        two pins, wherein each bracket wall has a surface facing the side bracket, each pin is protruded from the surface of each bracket wall respectively, and
        two guiding grooves, wherein each guiding groove is formed on each side bracket respectively, the pins are slid in the guiding grooves to guide the main bracket sliding into the server case.

12. The server of claim 11, wherein the bracket structure comprises a handle disposed on the main bracket for facilitating assembling the hard disk in the server case.

13. The server of claim 12, wherein the handle is a T-shaped handle.

14. The server of claim 11, wherein the pin is a cylinder.

15. The server of claim 11, wherein each guiding groove comprises an entrance section and a bottom section, each pin is slid into the bottom section from the entrance section.

16. The server of claim 15, wherein the entrance section is a downward inclined opening, the bottom section is a horizontal flange.

17. The server of claim 15, wherein each side bracket comprises a position protrusion disposed under the entrance section respectively.

18. The server of claim 17, wherein the main bracket comprises two position holes corresponding to the position protrusions, the position holes are disposed between the bracket wall and the chassis, wherein the position protrusions are coupled with the position holes to position the main bracket in the server case.

19. The server of claim 11, wherein the each case wall has a case opening, each side bracket has a hook corresponding to the case opening, the hooks are coupled with the case openings to fix the side bracket on the server case.

\* \* \* \* \*